(12) United States Patent
Zieten

(10) Patent No.: US 10,801,542 B1
(45) Date of Patent: Oct. 13, 2020

(54) DRUM COVER FOR A DRIVE DRUM

(71) Applicant: MUHLEN SOHN GmbH & Co. KG, Blaustein (DE)

(72) Inventor: Lars Oliver Zieten, Blaustein (DE)

(73) Assignee: MUHLEN SOHN GmbH & Co. KG, Blaustein (DE)

( * ) Notice: Subject to any disclaimer, the term of this patent is extended or adjusted under 35 U.S.C. 154(b) by 0 days.

(21) Appl. No.: 16/583,040

(22) Filed: Sep. 25, 2019

(30) Foreign Application Priority Data

May 22, 2019 (EP) .................................. 1917603838

(51) Int. Cl.
*F16C 13/00* (2006.01)

(52) U.S. Cl.
CPC ................... *F16C 13/00* (2013.01)

(58) Field of Classification Search
CPC ...................................... F16C 13/00
USPC ......................................... 198/824
See application file for complete search history.

(56) References Cited

U.S. PATENT DOCUMENTS

| 4,595,737 A | 6/1986 | Straub et al. |
| 6,875,164 B1 * | 4/2005 | Lebold ............... G03G 15/2025 29/895.211 |
| 2011/0041713 A1 * | 2/2011 | Haakmann .............. B41F 31/26 101/217 |

FOREIGN PATENT DOCUMENTS

| DE | 0168684 A2 | 1/1986 |
| WO | WO2007/122708 A1 | 1/2007 |
| WO | WO2018/001395 A1 | 1/2018 |

OTHER PUBLICATIONS

European Search Report in EPA 19176038.8 (in German language)—relevance is provided in the accompanying IDS Transmittal Letter.
Database WPI Week 199605, Thomson Scientific, London, GB; AN 1996-045719; XP002795396.

* cited by examiner

*Primary Examiner* — Gene O Crawford
*Assistant Examiner* — Lester Ill Rushin
(74) *Attorney, Agent, or Firm* — Ted Whitlock; Santucci Priore PL

(57) ABSTRACT

A drum cover (20*a*-*c*) for a drive drum (12) of a corrugated cardboard machine has a textile carrier layer (21), which has a first coating (22) on a first side and a second coating (23) on a second side. The second coating (23) has a glass transition temperature in the range of −20° C. to 60° C.

12 Claims, 3 Drawing Sheets

DRUM COVER FOR A DRIVE DRUM

This invention relates to a drum cover for a drive drum of a corrugated cardboard machine.

PRIOR ART

Corrugated cardboard machineshave upper belts and lower belts which transport the corrugated cardboard through the corrugated cardboard machine. Drive drums are used to transmit force to the upper belts and lower belts. To ensure optimum force transmission from a drive drum to the belt, the drive drums, also known as drive rollers, are provided with a drum cover. This results in minimum belt slippage for optimizing force transmission and for minimizing wear on the belts. This increases the efficiency of the corrugated cardboard machine. Drum covers have a service life of 3 to 5 years and are typically firmly bonded to the drive drums. To replace the covers, the drive drums are processed and covered in the production line of the corrugated cardboard machine. The corrugated cardboard machine has to be shut down while this time-consuming work is being performed. Furthermore, during the replacement of the covers there may be risks of injury resulting from mechanical work or also health risks due to the use of solvent-containing adhesives.

WO 2018/001395 A1 describes a self-tensioning drum cover for a drive drum of a corrugated cardboard machine. This cover has a textile carrier material which shrinks reversibly when heated. It consists of two rectangular strips, which are each connected on a narrow side to a convexly deltoid-shaped area. To provide the drive drum with the drum cover, the center axis of the convexly deltoid-shaped area is arranged along the circumferential center axis of the drive drum. It is secured there by means of fixing rivets. The drive drum is then rotated such that the strips are wound helically around the drive drum. The strips are cut off at their ends, where they are secured to the drive drum surface by means of further fixing rivets. Upon process-related temperature increase in the corrugated cardboard machine, the drum cover undergoes a shrinkage, which tensions it. Upon cooling, the drum cover returns to its original form by virtue of the reversible shrinkage behavior such that it can be easily removed from the drive drum. This self-tensioning represents an innovative solution for securing a drum cover on a drive drum without firm bonding. However, the operators have to use an unusual method to cover the drive drum.

Using rubberized drive drums is also known. However, the entire drive drum has to be replaced after the rubber coating wears out.

A problem addressed by this invention is therefore that of providing a drum cover which can be applied to the drive drum of a corrugated cardboard machine and removed therefrom quickly and with very little potential for danger. The application should take place in a manner similar to the application of standard adhesively bonded drum covers and therefore not require an operator of the corrugated cardboard machine to learn new working methods.

DISCLOSURE OF THE INVENTION

This problem is solved by a drum cover for a drive drum of a corrugated cardboard machine, which cover has at least three layers. A textile carrier layer, in particular a textile fabric layer, functions as a substrate of the drum cover. On a first side, the textile carrier layer has a first coating and on a second side, the textile carrier layer has a second coating. The first side is intended to be arranged on the belt side on the drive drum. The second side is intended to be arranged on the drum side on the drive drum. The first coating thus serves to prevent the upper belt or lower belt from slipping off the drive drum. In this manner, an optimum force transmission between the drive drum and the belt concerned is ensured. The purpose of the second coating is to prevent the drum cover from detaching from the surface of the drive drum. In the case of standard drum covers, this problem is solved by an adhesive layer applied to the drum surface, which bonds the drum cover firmly to the drive drum.

The invention is based on the finding that this problem can also be solved by a second coating applied to the textile carrier layer and having a glass transition temperature in the range of −20° C. to 60° C. The glass transition temperature is preferably in the range of 0° C. to 50° C., more preferably in the range of 10° C. to 40° C. A polymer, upon exceeding its glass transition temperature, transitions from a solid state into a rubber-like or viscous state. The glass transition temperature can be determined in particular by means of differential scanning calorimetry (DSC). In this process, the heat capacity of the coating material is measured as a function of its temperature. The heat capacities above and below the glass transition temperature differ, wherein a continuous transition occurs near the glass transition temperature. The measurement method is described in the standard DIN EN ISO 11357-2:2014-07.

The ambient temperature typically prevailing in a factory is near the glass transition temperature of the second coating. This second coating therefore has a certain adhesiveness which, with the corrugated cardboard machine at standstill, enables the drum cover to be adhesively bonded to the drive drum and remain in its position without having to use additional adhesive. According to the invention, it should in fact be possible to forego the use of such an adhesive. However, the adhesiveness of the second coating is sufficiently slight at this temperature such that the drum cover along with the second coating can be peeled off the drive drum without leaving any residue and without having to use sharp tools. A dropping of the ambient temperature below the glass transition temperature to such an extent that the drum cover would no longer adhere to the drive drum does not occur under normal working conditions. If the drum cover had a second coating which likewise exhibited this slight adhesiveness when the corrugated cardboard machine is running, the drum cover would detach from the drive drum under the considerable mechanical loads imposed by the upper belt or lower belt. However, the second coating used according to the invention has the advantage that it heats significantly above its glass transition temperature when the corrugated cardboard machine is running. As a result, its toughness and adhesiveness increase to the extent that a detachment of the drum cover from the drive drum is precluded. However, this process is completely reversible after the corrugated cardboard machine is switched off and has cooled down. The adhesiveness of the second coating diminishes as it cools down such that a worn drum cover can be replaced without any problem.

In order to provide a second coating having the required glass transition temperature, the second coating preferably contains at least one polymer selected from the group consisting of polyacrylates, acrylate copolymers, acrylate terpolymers, rubbers, silicones, polyurethanes and mixtures thereof. Particular preference is given to polyacrylates, acrylate copolymers and acrylate terpolymers. The polymer must be selected such that the required glass transition temperature of the second coating is reached. Vulcanized rubbers, for example, which have very high glass transition temperatures and which can be used as coatings for rubberized drive drums, but which would be unsuitable for the second coating, are known to the prior art. The glass transition temperature of polyacrylates, for example, also varies considerably in relation to the length of their side chains. A polyacrylate with very short side chains, for example polymethyl methacrylate (PMMA), which has a glass transition temperature in the range of 100° C. to 120° C., could not be used alone to obtain a second coating which would be suitable for the drum cover according to the invention.

If the required glass transition temperature of the second coating is not reached by a homopolymer, further components can then be copolymerized during the production of the second coating in order to modify the glass transition temperature of the coating such that it is in the desired range. The polymer is preferably produced by copolymerizing acrylic acid or a salt of the acrylic acid with an N-vinyl lactam or with an N-vinyl acid amide and with at least one alkyl vinyl ether.

In particular, the mixing ratio of the monomers can be selected according to the Fox equation so as to give rise to the desired glass transition temperature $T_G$ of the copolymers or terpolymers:

$$\frac{1}{T_G} = \sum_n \frac{w_n}{T_{G,n}}$$

In this equation, n represents the running number of the monomers used, $w_n$ represents the mass fraction of the given monomer n in wt %, and $T_{G,n}$ represents the given glass transition temperature of the homopolymer of the respective monomers n. The Fox equation is described in T. G. Fox, *Bull. Am. Phys. Soc.* 1956, 1, 123.

Even though substantially exceeding the glass transition temperature of the second coating, in order to increase the adhesiveness thereof, while the corrugated cardboard machine is running is desirable, on the other hand liquefaction of the second coating could cause the textile carrier layer to detach from the drive drum and should therefore be avoided. Corrugated cardboard machines are usually run at operating temperatures in the range of 80° C. to 120° C. However, temporary peak temperatures as high as 150° C. may be reached. In order to ensure a sufficient interval between the temperatures generated when a corrugated cardboard machine is running and the melting point of the second coating, it is therefore preferable for the melting point of the second coating to be at least 180° C.

In order to ensure a firm bonding of the drum cover to the drive drum while the corrugated cardboard machine is running, the second coating should not be too thin. Nor should it be too thick, as then the force to be transmitted by the drive drum to the upper belt or to the lower belt will be absorbed in too great a proportion within the second coating due to shearing. It was found that a preferred thickness of the second coating ranges from 0.1 mm to 0.5 mm. Furthermore, the weight per unit area of the second coating is preferably in the range of 300 g/m$^2$ to 500 g/m$^2$.

The adhesiveness of the second coating, even at room temperature, poses the risk of dirt particles adhering to the coating in the unassembled state of the drum cover. At the places where dirt particles are stuck on the second coating, there would not be a secure bonding between the second coating and the drive drum surface when the drum cover is applied to the drive drum. Preference is therefore given to applying a cover layer to the second coating. This cover layer protects the second coating from dirt and it can be peeled off immediately before applying the drum cover to the drive drum. Materials particularly well-suited for the cover layer include polyethylene and/or polypropylene. These materials can be applied to the second coating in the form of a plastic film, which not only adheres to the coating with sufficient firmness to prevent inadvertent detachment, but can also be removed from the second coating with little effort immediately before applying the drum cover to the drive drum.

For easy application of the drum cover to a drive drum, the thickness of the cover is preferably at most 15 mm, more preferably at most 10 mm. However, the thickness of the textile carrier material is preferably in the range of 1 mm to 9 mm, more preferably in the range of 4 mm to 7 mm, in order to ensure sufficient durability of the drum cover.

The textile carrier layer preferably contains threads and/or fibers made of at least one polyester.

The combination of the textile carrier material and the two coating materials is preferably selected such that the drum cover has a Shore A hardness greater than 50. This can be determined according to the standard DIN ISO 7619-1. A hardness of this magnitude imparts a long service life to the drum cover during use in a corrugated cardboard machine such that replacement of the drum cover, for which the corrugated cardboard machine has to be shut down, is seldom necessary.

The first coating preferably contains a coating material selected from the group consisting of rubbers, silicones, polyurethanes and mixtures thereof. The first coating particularly preferably consists of this coating material. Silicones, in particular polydimethylsiloxane, are particularly preferred as coating materials. Crosslinked polydimethylsiloxanes are most preferred. Selected representatives of these material classes have high abrasion resistance and high coefficients of friction, which prevents the upper belt or the lower belt from slipping off the drum cover.

The thickness of the first coating is preferably in the range of 0.1 mm to 3.0 mm. It is more preferably in the range of 0.5 mm to 1.5 mm.

BRIEF DESCRIPTION OF THE DRAWINGS

An exemplary embodiment of the invention is depicted in the drawings and is described in more detail in the following descriptions.

EXEMPLARY EMBODIMENT OF THE INVENTION

Figure 1:
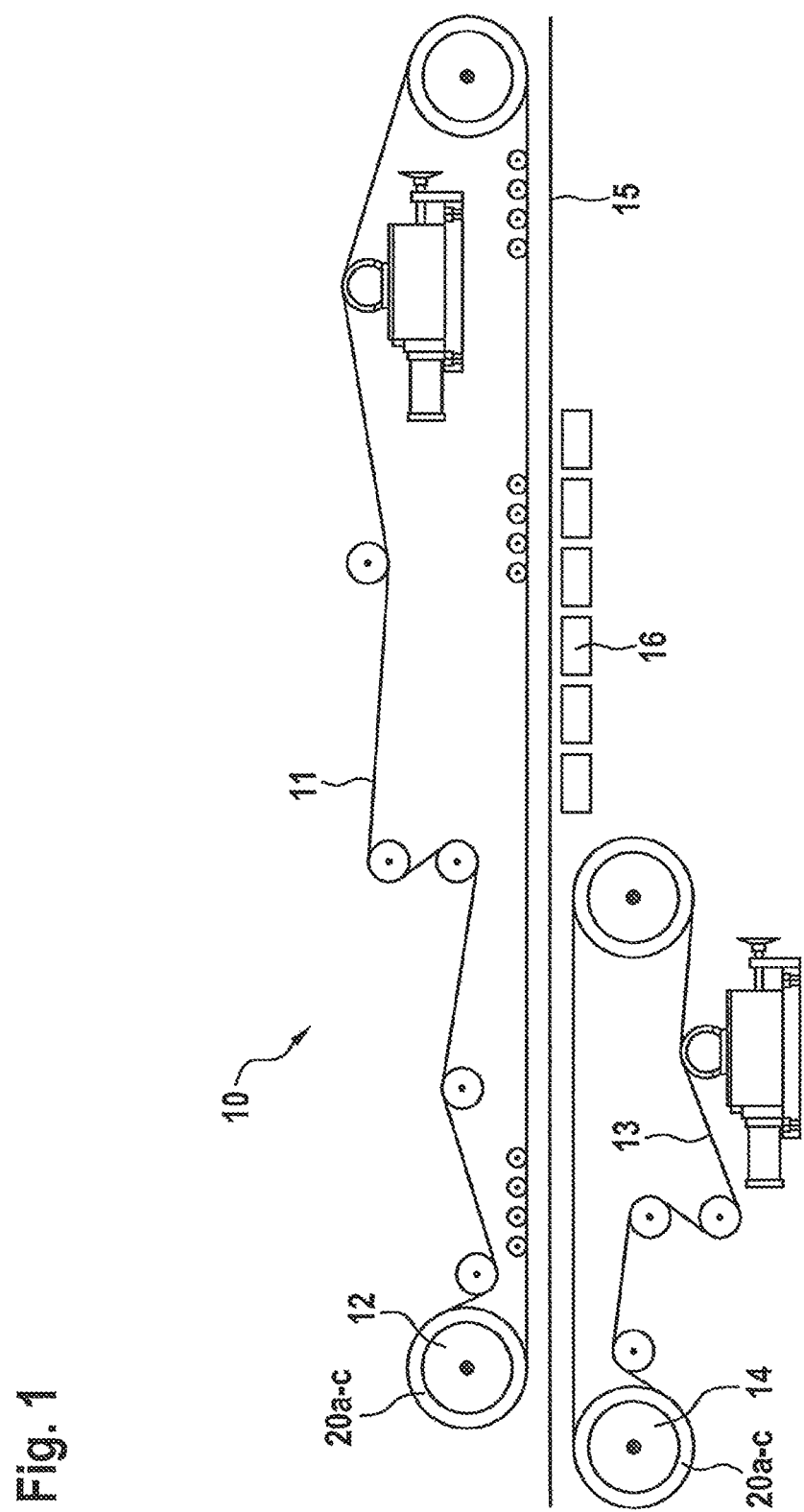
FIG. 1 shows a schematic lateral view of a corrugated cardboard machine, of which the drive drums have drum covers according to an exemplary embodiment of the invention.

The key components of a corrugated cardboard machine 10, which has drum covers according to an exemplary embodiment of the invention, are illustrated in FIG. 1. An upper belt 11 is driven by a first drive drum 12, which is covered with three drum covers 20a-c according to an exemplary embodiment of the invention. A lower belt 13 is driven by a second drive drum 14, which is likewise covered with three drum covers 20a-c according to an exemplary embodiment of the invention. Multi-ply corrugated cardboard 15 is transported between the upper belt 11 and the lower belt 13 over heating plates 16 and the plies are thus bonded together. The two drive drums 12, 14 are standard steel drums 90 cm in diameter and 280 cm in length. The drum length determines the maximum width of the corrugated cardboard sheet 15 which can be transported in the corrugated cardboard machine 10.

Figure 2:
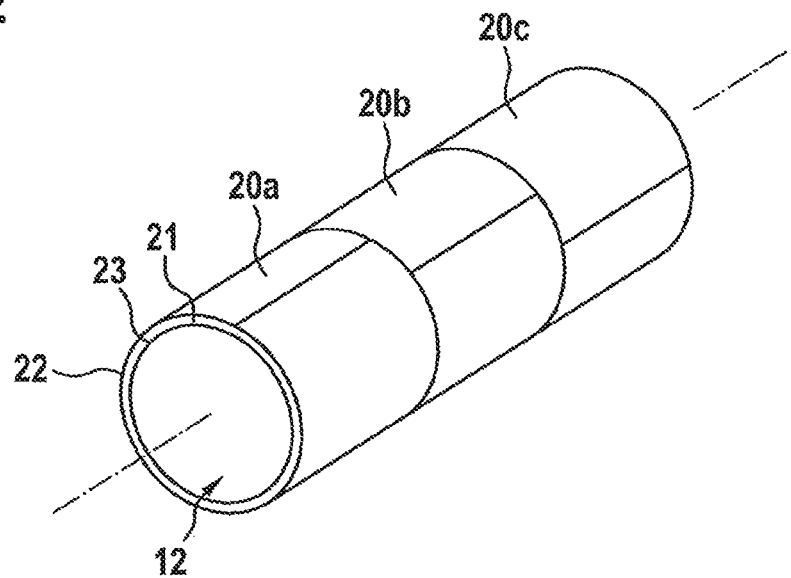
FIG. 2 shows an isometric representation of a drive drum, which has drum covers according to an exemplary embodiment of the invention.

FIG. 2 shows the arrangement of the three drum covers 20a-c on the first drive drum 12. These covers are each wrapped around the circumference of the drive drum 12 such that the two ends of each of the drum covers 20a to 20c touch one another. Along the longitudinal axis of the drive drum 12, the respective adjacent drum covers 20a-c likewise touch one another such that the surface of the drive drum 12 is covered completely by the drum covers 20a to 20c. Each of the drum covers 20a-c has a substrate in the form of a textile carrier layer 21, which is configured as a textile fabric layer. On the side of the drum cover facing away from the surface of the drive drum 12, the textile carrier layer 21 is coated with a first coating 22. On its side facing the surface of the drive drum 12, the textile carrier layer 21 is coated with a second coating 23.

Figure 3:
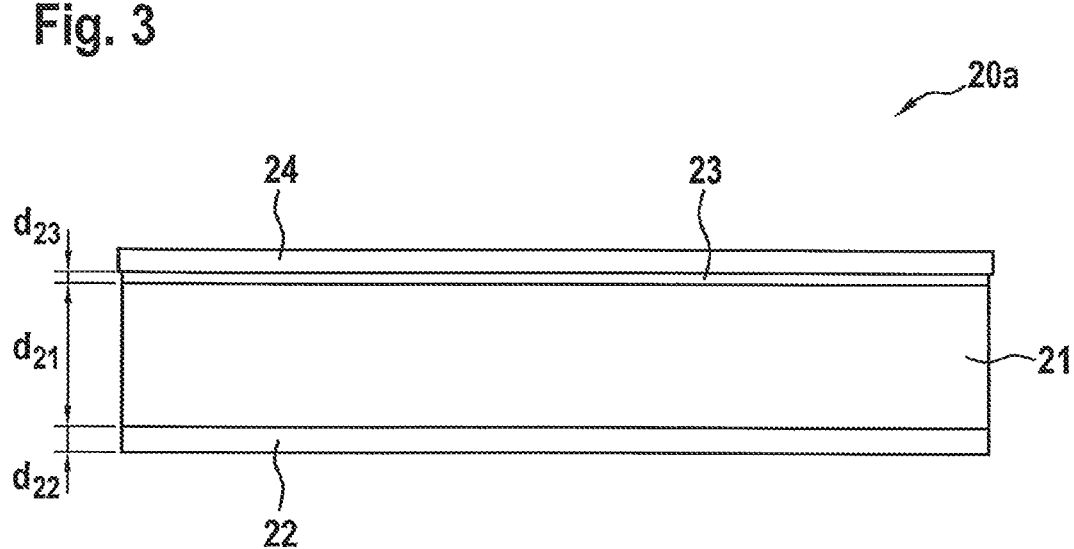
FIG. 3 shows a cross sectional view of a drum cover according to an exemplary embodiment of the invention.

FIG. 3 shows a drum cover 20a before it was applied to the drive drum 12. The textile carrier layer 21 has a thickness $d_{21}$ of 5.5 mm. The first coating 22 has a thickness $d_{22}$ of 1.0 mm. The second coating 23 has a thickness $d_{23}$ of 0.3 mm. A cover layer 24 in the form of a polyethylene film is applied to the second coating 23.

To apply the illustrated drum cover 20a to the drive drum 12, the cover layer 24 is peeled off the second coating 23 and the drum cover 20a is then wrapped around the drive drum 12 such that the second coating 23 is facing the surface of the drive drum 12. When the corrugated cardboard machine 10 is running, the second coating 23 heats up and its adhesiveness thus increases. A detachment of the drum cover 20a from the drive drum 12 is thus precluded. If the drum cover 20a needs to be removed due to heavy wear on the drive drum 12, the corrugated cardboard machine 10 is switched off and it is waited until the drum cover 20a and thus also the second coating 23 have cooled down to room temperature. As a result, the adhesiveness of the second coating 23 diminishes sufficiently such that the drum cover 20a can be easily detached from the drive drum 12. This detachment is accomplished without leaving any residues of the second coating 23 on the surface of the drive drum 12. The second coating 23 bonds more firmly with the textile carrier layer 21 than with the smooth surface of the drive drum 12. A new drum cover can thus be applied immediately to the surface of the drive drum 12 without having to remove any adhesive residue therefrom, and the corrugated cardboard machine 10 can resume operation. The Shore A hardness of the drum cover 20a is 54, hence it is wear-resistant and seldom has to be replaced.

Figure 4:
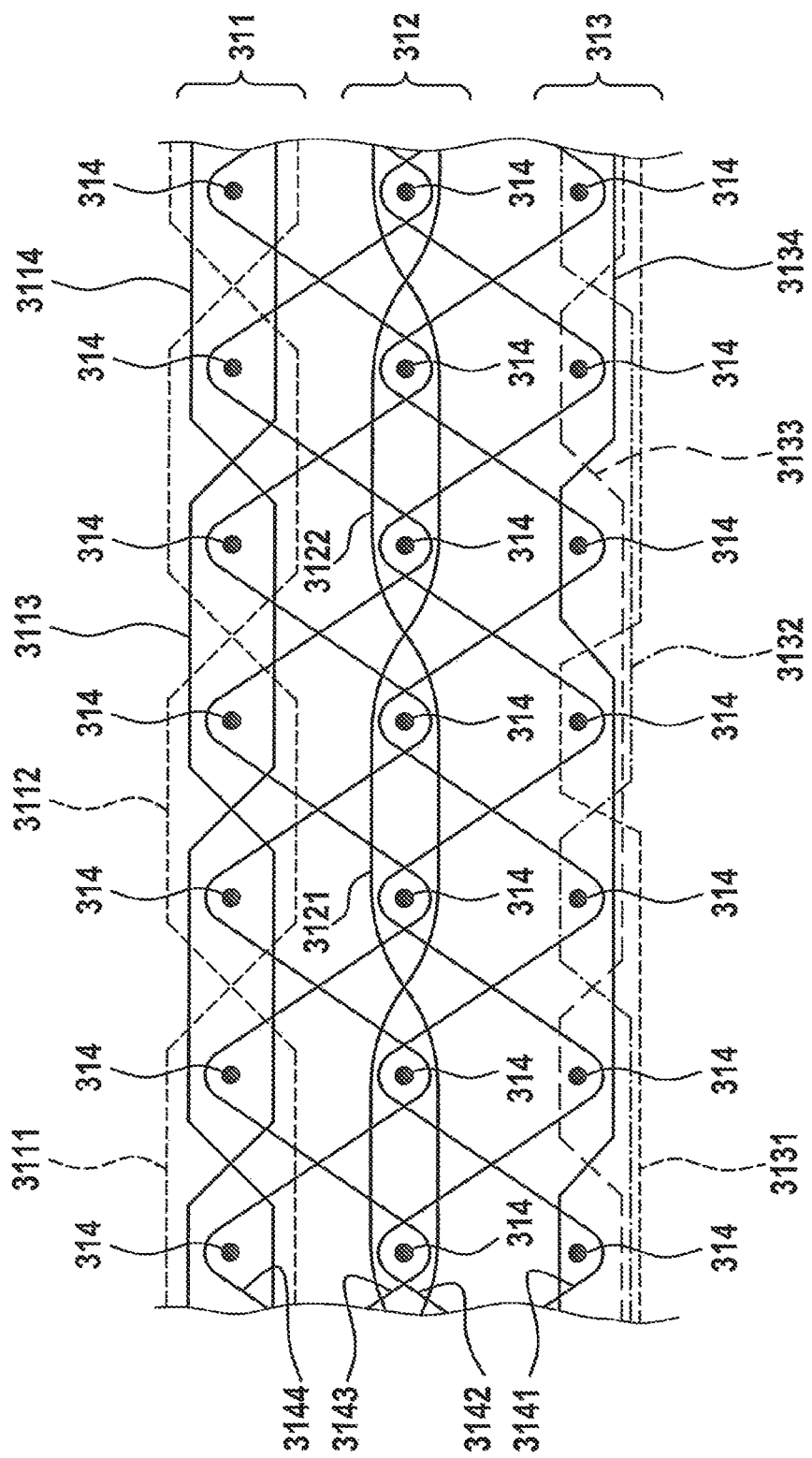
FIG. 4 shows a longitudinal section of a textile carrier material of a drum cover according to an exemplary embodiment of the invention.

The fabric of the textile carrier layer 21 is illustrated in FIG. 4. Polyester weft threads 314 run transversely to the longitudinal direction of the fabric in three fabric plies 311, 312, 313. In the upper fabric ply 311, four warp threads 3111, 3112, 3113, 3114 made of a polyester/rayon blend and running offset relative to each other are provided, which run inward to the middle fabric ply 312 as well as outward over at least two weft threads 314 in each case. The middle fabric ply 312 has two polyester warp threads 3121, 3122 running offset relative to each other, which run over two weft threads 314 in each case. The lower fabric ply 313 consists of 4 warp threads 3131, 3132, 3133, 3134 made of the polyester/rayon mixture, each running offset relative to one another and running inward to the middle fabric ply 312 over only one weft thread 314 and outward over at least three weft threads 314. The three fabric plies 311, 312, 313 are interwoven by binding threads 3141, 3142, 3143, 3144 made of the polyester/rayon mixture. The binding threads are subdivided into 2 thread groups in each case, wherein the binding threads 3143, 3144 forming the one thread group run offset relative to one another and bind the upper fabric ply 311 to the middle fabric ply 312. The binding threads 3143 and 3144 are each alternatingly guided around one weft thread 314 in the upper fabric ply 311 and around one weft thread 314 in the middle fabric ply 312.

The thread group formed from the binding threads 3141 and 3142 binds the lower fabric ply 313 to the middle fabric ply 312 in a corresponding manner.

The first coating 22 consists of polydimethylsiloxane with a filler and an adjuvant and a triacedoxyethylsilane cross-linking agent (Elastosil E43 N from the company Wacker Chemie).

The second coating 23 consists of a terpolymer, which was produced from vinylpyrrolidone, acrylic acid and vinyl ethyl ether in a mass ratio of 100:50:350. The polymerization took place in the solvent dioxane, with tert-butyl peroxypivalate used as an initiator according to a synthesis protocol described in DE 34 23 446 A1. The terpolymer has a glass transition temperature of 23° C. The weight per unit area of the second coating 23 is 425 g/m².

To produce the drum cover 20a according to this exemplary embodiment of the invention, provision is made of a textile carrier layer 21, which is coated on one side with the first coating 22. 800 g/m² of an aqueous dispersion of the coating material of the second coating 23 are applied on the opposite side. The solid content of this aqueous dispersion is 53 wt %. After evaporation of the fluid components of the second coating 23, the latter is covered with the cover layer 24. The drum cover 20a is now in a transportable form, in which inadvertent sticking of dirt on the second coating 23 is prevented.

The invention claimed is:

1. A drum cover (20a-c) for a drive drum (12, 14) of a corrugated cardboard machine (10), having a textile carrier layer (21) which has a first coating (22) on a first side and a second coating (23) on a second side, wherein the second coating (23) has a glass transition temperature in the range of −20° C. to 60° C.

2. The drum cover (20a-c) according to claim 1, characterized in that the second coating (23) contains at least one polymer, which is selected from the group consisting of polyacrylates, acrylate copolymers, acrylate terpolymers, rubbers, silicones, polyurethanes and mixtures thereof.

3. The drum cover (20a-c) according to claim 2, characterized in that the polymer was produced by copolymerizing acrylic acid or a salt of the alkyl acid with an N-vinyl lactam or an N-vinyl acid amide and with at least one alkyl vinyl ether.

4. The drum cover (20a-c) according to claim 1, characterized in that the second coating (23) has a melting point of at least 180° C.

5. The drum cover (20a-c) according to claim 1, characterized in that the second coating (23) has a thickness (d23) in the range of 0.1 mm to 0.5 mm.

6. The drum cover (20*a*-*c*) according to claim 1, characterized in that the second coating (23) has a weight per unit area in the range of 300 g/m2 to 500 g/m2.

7. The drum cover (20*a*-*c*) according to claim 1, characterized in that a cover layer (24) is applied to the second coating (23).

8. The drum cover (20*a*-*c*) according to claim 7, characterized in that said cover layer has a Shore A hardness of more than 50.

9. The drum cover (20*a*-*c*) according to claim 1, characterized in that the textile carrier layer (21) contains threads and/or fibers made of at least one polyester.

10. The drum cover (20*a*-*c*) according to claim 1, characterized in that the textile carrier layer (21) has a thickness (d21) in the range of 1 mm to 9 mm.

11. The drum cover (20*a*-*c*) according to claim 1, characterized in that the first coating (22) contains at least one coating material selected from the group consisting of rubbers, silicones, polyurethanes and mixtures thereof.

12. The drum cover (20*a*-*c*) according to claim 1, characterized in that the first coating (21) has a thickness (d21) in the range of 0.1 mm to 3.0 mm.

\* \* \* \* \*